United States Patent
Kitahara et al.

(10) Patent No.: US 7,234,870 B2
(45) Date of Patent: Jun. 26, 2007

(54) PLAIN BEARING

(75) Inventors: Ken Kitahara, deceased, late of Inuyama (JP); by Keiko Kitahara, legal representative, Nagoya (JP); Katsumi Asai, Inuyama (JP); Arihiro Kimura, Inuyama (JP); Atsushi Okado, Inuyama (JP); Masaaki Sakamoto, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 104 days.

(21) Appl. No.: 11/068,846

(22) Filed: Mar. 2, 2005

(65) Prior Publication Data

US 2005/0196084 A1 Sep. 8, 2005

(30) Foreign Application Priority Data

Mar. 3, 2004 (JP) .............................. 2004-058552

(51) Int. Cl.
*F16C 33/10* (2006.01)
(52) U.S. Cl. ...................................... 384/288; 384/291
(58) Field of Classification Search ........ 384/286–288, 384/291, 294, 429–433
See application file for complete search history.

(56) References Cited

U.S. PATENT DOCUMENTS 1,748,120 A * 2/1930 Fisher ........................ 384/288
4,235,481 A * 11/1980 Fukuoka et al. ............ 384/431
5,009,522 A 4/1991 Hahn
6,082,904 A 7/2000 Ono et al.
6,868,810 B2 * 3/2005 Hojo et al. .................. 384/288

FOREIGN PATENT DOCUMENTS

| DE | 69102094 T2 | 9/1994 |
| JP | 61 573 Y2 | 1/1986 |
| JP | 7071458 A | 3/1995 |
| WO | WO 2004038188 A1 * | 5/2004 |

* cited by examiner

*Primary Examiner*—Thomas R. Hannon
(74) *Attorney, Agent, or Firm*—Browdy and Neimark, PLLC

(57) ABSTRACT

A plain bearing comprising a housing and two plain bearing halves forming a cylindrical shape in combination and fixed in the housing. Each of the plain bearing halves has crush reliefs formed at both ends of an inner circumferential surface thereof in a circumferential direction, an oil groove formed on the inner circumferential surface thereof and extending in the circumferential direction, a central crown portion at substantially central position in the circumferential direction and in communication with the oil groove, and inflow preventing portions formed between the crush reliefs and the oil groove.

3 Claims, 4 Drawing Sheets

PLAIN BEARING

BACKGROUND OF THE INVENTION

The present invention relates to a plain bearing comprising two plain bearing halves which form a cylindrical shape in combination and are fixed in a housing and in each of which an oil groove is formed on an inner circumferential surface along a circumferential direction and crush relieves are formed at both ends of the inner circumferential surface in the circumferential direction.

Conventionally, in plain bearings that support a rotating shaft such as a crankshaft for internal combustion engines, plain bearings comprising two plain bearing halves which form a cylindrical shape in combination are used. They have structure in which lubrication oil is supplied between the plain bearing and the rotating shaft by oil grooves formed on an inner circumferential surface of the plain bearing halves in a circumferential direction to form an oil film therebetween.

In such plain bearings, in order to prevent the lubrication oil in the oil grooves from leaking from vicinities of joints of the plain bearing halves, it has been proposed to locate ends of the oil grooves at predetermined positions spaced from ends of the plain bearing halves instead of providing the oil grooves circumferentially over the entire plain bearing halves, thereby preventing the lubrication oil in the oil grooves from entering the joints of plain bearing halves (for example, see JP-Y2-61-573).

On the other hand, in the case of the plain bearing comprising plain bearing halves described above, when plain bearing halves are mounted in the housing, there are some cases where misalignment is generated at joints of ends of plain bearing halves, or deformation is caused in the vicinity of the joints of the ends of the plain bearing halves if crush height is too high. Such misalignment or deformation at the joints possibly produces a bulge in a radial and inward direction and the bulge comes into local contact with a shaft.

Therefore, it has been proposed to form crush relieves at both ends of the inner circumferential surfaces of the plain bearing halves in the circumferential direction, thereby preventing local contact between the ends of the plain bearing halves and the shaft. In such plain bearings in which crush relieves are formed, there is a problem that the lubrication oil supplied to the oil grooves flow into the crush relieves to leak out from the crush relieves in an axial direction, so that oil pressure in a lubricating system is lowered.

By the way, the plain bearing disclosed in JP-Y2-61-573 is not formed with crush relieves and so free from the problem that leakage of a lubrication oil due to the provision of the crush relieves results a drop in oil pressure in the lubricating system, but involves a problem that local contacts are resulted between ends of plain bearing halves and the shaft.

In view of the above circumstances, the invention has been thought of and has its object to provide a plain bearing which has crush relieves and can prevent reduction in oil pressure in a lubricating system.

SUMMARY OF THE INVENTION

According to the present invention, there is provided a plain bearing comprising a housing and two plain bearing halves forming a cylindrical shape in combination and fixed in the housing, each of the plain bearing halves having crush relieves formed at both ends of an inner circumferential surface thereof in a circumferential direction, an oil groove formed on the inner circumferential surface thereof and extending in the circumferential direction, a central crown portion at substantially central position in the circumferential direction and in communication with the oil groove, and inflow preventing portions formed between the crush relieves and the oil groove.

The inflow preventing portions extend circumferentially in a range of 0 to 15 degrees from the crush relieves toward the oil supply hole.

It is preferable that when the housing has a housing groove formed on an inner circumferential surface thereof at a position corresponding to back sides of the oil grooves of the plain bearing halves, fatigue preventive grooves having the same width as that of the oil grooves and being shallower in depth than the crush relieves are formed on the inflow preventive portions.

DETAILED DESCRIPTION OF THE INVENTION

Figure 1:
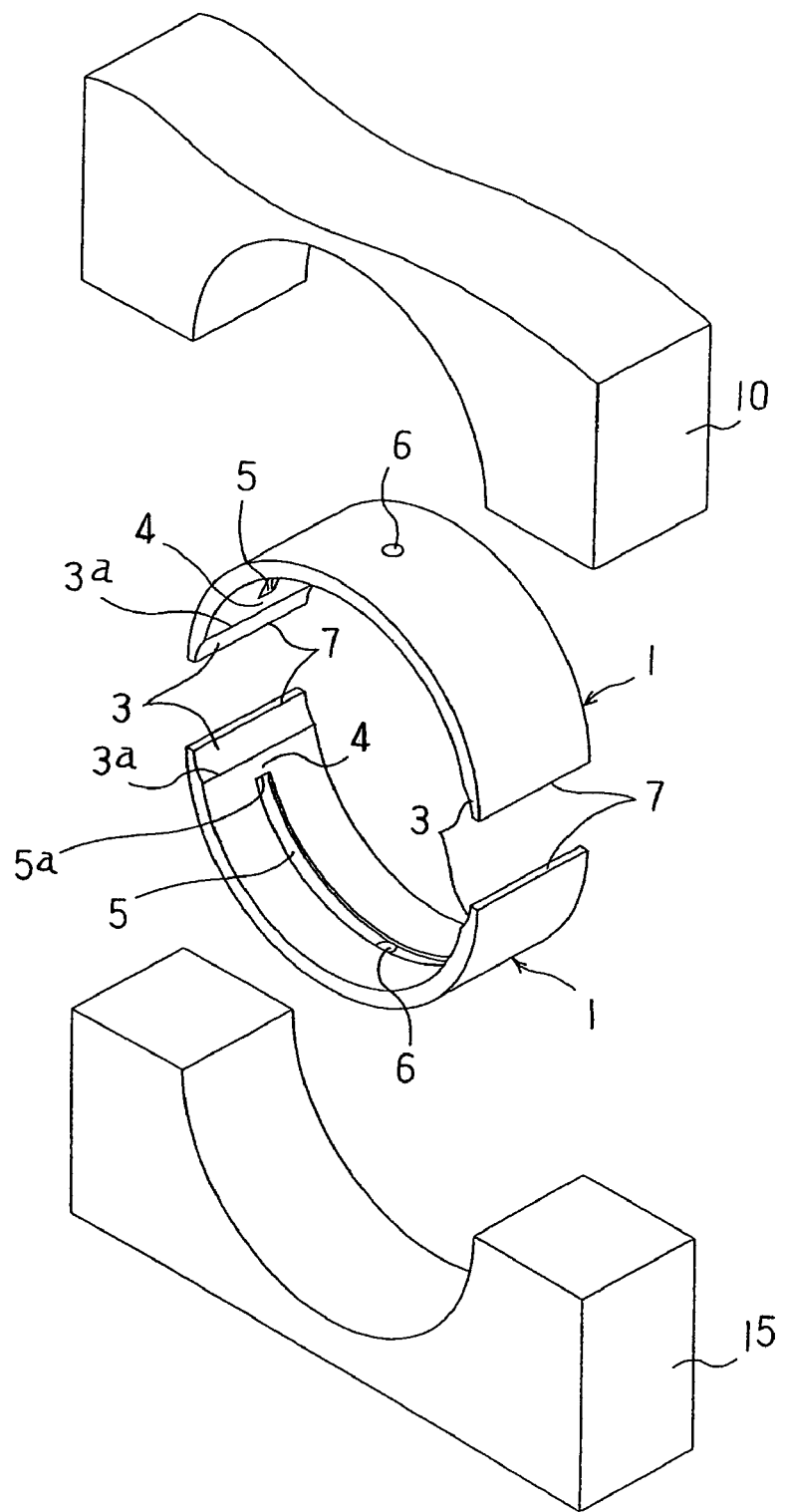
FIG. 1 is an exploded, perspective view showing the relationship between housing halves and plain bearing halves of a plain bearing of the invention.
Figure 2:
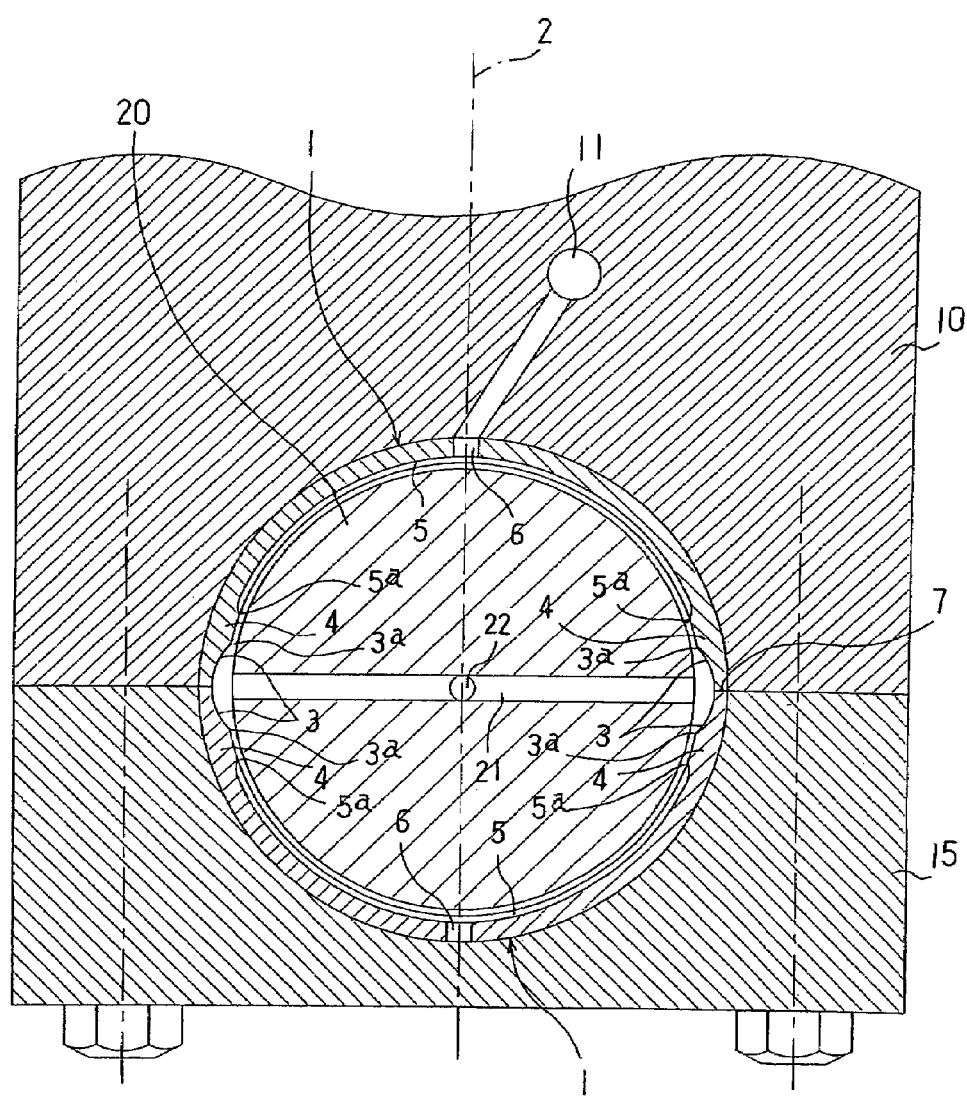
FIG. 2 is a cross sectional view showing a state, in which a shaft is supported by the plain bearing.
Figure 3:
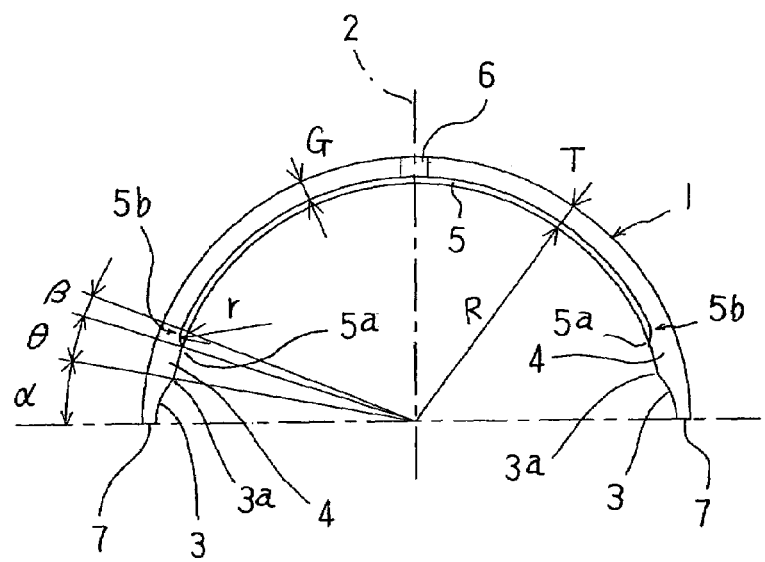
FIG. 3 is a cross sectional view showing the plain bearing half.
Figure 5:
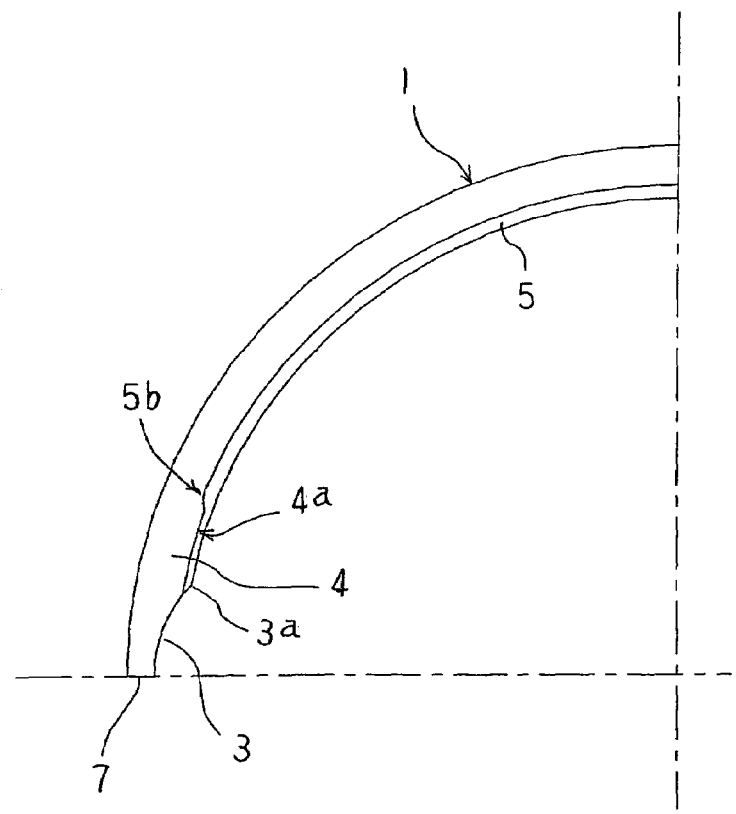
FIG. 5 is a cross sectional view showing a shallow fatigue preventive groove.
Figure 4:
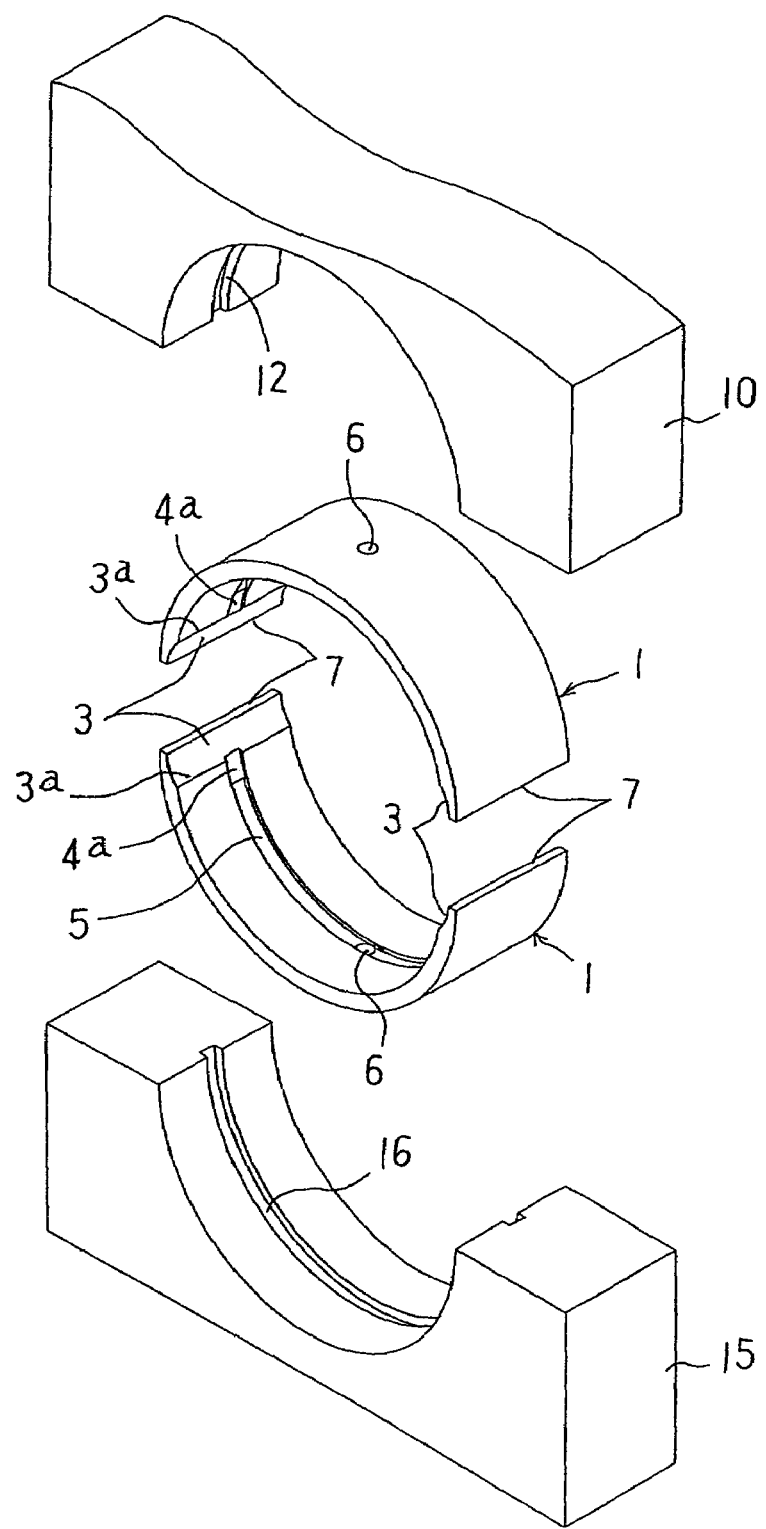
FIG. 4 is an exploded, perspective view showing the relationship between the housing halves and the plain bearing halves in the case where housing grooves are formed on the housing halves.

Embodiments of the invention will be described hereinafter with reference to FIGS. 1 to 4. FIG. 1 is an exploded perspective view showing the relationship between housing halves 10, 15 and plain bearing halves 1, FIG. 2 is a cross sectional view showing a state, in which a shaft 20 is supported by a plain bearing, FIG. 3 is a cross sectional view showing the plain bearing half 1 (hatching is omitted), FIG. 4 is an exploded perspective view showing the relationship between the housing halves 10, 15 and the plain bearing halves 1 in the case where housing grooves 12, 16 are formed on the housing halves 10, 15, and FIG. 5 is a cross sectional view showing a fatigue preventive groove 4a (hatching is omitted). In addition, the drawings are schematic views showing the plain bearing according to the invention, and for the purpose of intelligibility of the constitution, construction, etc., respective portions are depicted while being exaggerated or omitted.

The plain bearing according to the invention will be explained with respect to a plain bearing for supporting a main shaft of an automobile engine as one of examples of use. As shown in FIG. 1, the plain bearing 1 according to this embodiment is formed into a split shape, and two plain bearing halves 1 are combined to form a cylinder to rotatably support a shaft 20 (see FIG. 2). In order to satisfy the bearing characteristics, such as non-seizure, of the plain bearing, inner circumferential surfaces of the plain bearing halves 1 are lined with a sliding material such as copper alloy, aluminum alloy, tin or lead alloy, and overlaid with tin or lead alloy, or a synthetic resin at need.

An oil groove 5 is formed circumferentially and substantially centrally in an axial direction on the inner circumferential surface of the plain bearing half 1 to supply a lubrication oil between the plain bearing halves 1 and the shaft 20 (see FIG. 2) supported on the plain bearing halves 1. The oil groove 5 is formed at a constant depth over a predetermined region, both ends of the oil groove are formed as oil-groove progressive reduction portions 5b, depth of which is gradually decreased, and those portions, in which extensions of the oil-groove progressive reduction portions 5b and the inner circumferential surface intersect, are formed as oil-groove terminating portions 5a. A supply hole 6 for supplying lubrication oil to the oil groove 5 is provided at a substantially central position in the circumferential direction of the plain bearing half 1 so as to extend through the plain bearing half 1.

Both ends 7 of the inner circumferential surfaces of the plain bearing halves 1 in the circumferential direction are concavely cut off and formed as axially extending crush relieves 3. The crush relieves 3 serve to absorb deformation, which is resulted if misalignment is caused at joints of the ends 7 of the plain bearing halves 1 when two plain bearing halves 1 are combined to be made into a cylindrical shape or if crush height of the plain bearing halves 1 is too high, caused in the vicinity of the joints of the plain bearing halves 1. The deformation at the joints possibly becomes bulges in the radial direction to result a local contact with the shaft 20. Such local contact is prevented by beforehand cutting off the inner circumferential surfaces of the both ends 7 of the plain bearing halves 1 in a concave manner to form the crush relieves 3. The crush relieves 3 are gradually decreased in depth toward a central crown 2 of the bearing 1 halves, and endmost portions of the crush relieves 3 are formed as crush-relief terminating portions 3a. The crush relieves 3 are set to have a depth in the range of 0.01 to 0.05 mm.

Portions positioned on extensions of the oil groove 5 between the oil-groove terminating portions 5a and the crush-relief terminating portions 3a are formed as inflow preventive portions 4 to prevent lubrication oil retained in the oil groove 5 from flowing into the crush relieves 3. The inflow preventive portions 4 are formed to be flush with the inner circumferential surfaces of the plain bearing halves 1. The crush relieves 3, the inflow preventive portions 4 and the oil groove 5 are described later in detail.

The plain bearing halves 1 structured in the above manner are mounted on the housing 10 (for example, a cylinder block) and the housing 15 (for example, a cap), respectively, which constitute an engine, as shown in FIG. 1, and constructed in a cylindrical shape and mounted inside an engine by combining the housing 10 and the housing 15 together. As shown in FIG. 2, the shaft (main shaft) 20 is supported by the plain bearing halves 1 mounted inside an engine by the housings 10, 15. At this time, since the crush relieves 3 are formed on the inner circumferential surfaces of the both circumferential ends 7 of the plain bearing halves 1 as described above, it is possible to prevent the ends 7 of the plain bearing halves 1 from being deformed to come into local contact with the shaft 20.

Then, when the shaft 20 supported by the plain bearing halves 1 rotates, lubrication oil fed from a lubrication oil supply pump (not shown) is supplied into the oil grooves 5 through the supply holes 6 from an oil hole 11 formed in the housing 10. Oiling is made on the entire inner circumferential surfaces of the plain bearing halves 1 from the oil grooves 5 whereby an oil film is created between the plain bearing halves 1 and the shaft 20 and the shaft 20 can rotates smoothly. The lubrication oil supplied to the oil grooves 5 passes through a second oil passage 22 formed axially in the shaft 20 from a first oil passage 21 formed diametrically through the shaft 20 to be supplied to plain bearings (not shown), which support a con-rod shaft (not shown), to lubricate the same.

Description has been given to the construction, mounting and action of the plain bearing halves 1, and description will be given subsequently to the inflow preventive portions 4, which constitute the gist of the invention, with reference to FIG. 3.

As described above, the portions positioned on the extensions of the oil groove 5 between the oil-groove terminating portions 5a and the crush-relief terminating portions 3a are formed as the inflow preventive portions 4 to prevent lubrication oil retained in the oil groove 5 from flowing into the crush relieves 3. As shown in FIG. 3, the oil-groove terminating portions 5a are positioned circumferentially in the range of a predetermined angle $\theta$ from the crush-relief terminating portions 3a toward the central crown 2, and regions within the angle $\theta$ are formed as the inflow preventive portions 4. The reason why $\theta$ is set in the range of 0 to 15 degrees is that minimum inflow preventive portions 4 can be formed when $\theta$ is 0 degree, that is, the crush-relief terminating portions 3a and the oil-groove terminating portions 5a are positioned in agreement with each other, and that in case of over 15 degrees, the oil grooves 5 cannot have a sufficient length and lubrication oil supplied to and retained in the oil groove 5 is reduced in quantity. Preferably, it is desired that $\theta$ be set to 1 to 13 degrees. The reason for this is that since tip ends of the inflow preventive portions 4 can be made flat by setting a lower limit of $\theta$ to 1 degree, the effect of preventing lubrication oil from flowing into the crush relieves 3 from the oil groove 5 can be further heightened, and that since the oil groove 5 can be made longer by setting an upper limit of $\theta$ to 13 degrees, the effect of supplying and retaining lubrication oil can be further heightened.

In this manner, since the inflow preventive portions 4 are formed between the crush-relief terminating portions 3a and the oil-groove terminating portions 5a, it is possible to prevent the lubrication oil supplied into and retained in the oil groove 5 from flowing into the crush relieves 3 and to reduce leakage of the lubrication oil outside the plain bearing from the crush relieves 3. Thereby, since a drop in oil pressure is eliminated at the time of oiling on the plain bearings for the main shaft, a quantity of the oil supplied to plain bearings for the con-rod shaft is not decreased and so seizure and wear of the con-rod shaft are not generated. Also, since leakage of the lubrication oil from the crush relieves 3 is decreased, failure due to shortage of the lubrication oil supplied to other sliding portions such as plain bearings for the con-rod shaft, or the like can also be prevented. Further, by virtue of prevention of a drop in oil pressure, it is possible to ensure a necessary oil pressure for control of a variable valve mechanism of the engine, etc.

The crush-relief terminating portions 3a are formed in positions at a predetermined angle $\alpha$ from the ends 7 of the plain bearing half 1 toward the central crown 2 as shown in FIG. 3, and while the angle $\alpha$ varies depending upon an inside diameter of the plain bearing, it is normally set in a range of 1 to 25 degrees. However, it is desired that $\alpha+\theta$ be preferably 1 to 30 degrees, more preferably 1 to 20 degrees.

As described above, the oil groove 5 is formed at a constant depth over a predetermined region, both ends of the oil groove are formed as the oil-groove progressive reduction portions 5b, depth of which is gradually decreased, and those portions, in which extensions of the oil-groove progressive reduction portions 5b and the inner circumferential surface intersect, are formed as the oil-groove terminating portions 5a. An angle β shown in FIG. 3 indicates one between the oil-groove terminating portion 5a and a border of the oil groove 5 and the oil-groove progressive reduction portion 5b. That is, the ends of the oil groove 5 are formed as the oil-groove progressive reduction portions 5b over the range of the angle β. The angle β is represented by the following formula.

$$\beta = \tan^{-1}([R^2 - \{(R^2-r^2+a^2)/2a\}^2]^{1/2}/\{(R^2-r^2+a^2)/2a\})$$

where R: inside diameter of plain bearing/2, r: radius of oil-groove progressive reduction portion, T: finished wall thickness, G: thickness of a groove bottom, and a=(R+T)−(r+G). In addition, the radius r of the oil-groove progressive reduction portion 5b is determined by a cutter radius when the oil groove 5 is formed.

As described above, while the value of β is determined by various dimensions such as inside diameter of the plain bearing halves 1, etc., the smaller the value of β, the larger a volume of the oil groove 5 and the a lubrication oil as retained can be increased in quantity, so that it is desirable to make the value of β as small as possible.

While description has been given to the inflow preventive portions 4, etc. formed on the plain bearing half 1 according to the embodiment (first embodiment), description will be given subsequently to an embodiment (second embodiment), in which shallow fatigue preventive grooves 4a are formed on inflow preventive portions 4. In addition, members having the same functions as those in the first embodiment are denoted by the same reference numerals as those in the first embodiment.

Housing grooves 12, 16, respectively, are formed entirely circumferentially and substantially centrally in an axial direction on inner circumferential surfaces of housings 10, 15 according to the second embodiment shown in FIG. 4. The housing grooves 12, 16 are formed at a constant depth over predetermined regions, and the housing grooves are formed in positions corresponding to back sides of the oil grooves 5 formed on the plain bearing halves 1 when the plain bearing halves 1 are mounted on the housings.

In this manner, the housing grooves 12, 16 are in some cases formed on those inner circumferential surfaces, on which the plain bearing halves 1 are mounted, and the shallow fatigue preventive grooves 4a having the same width as that of the oil groove 5 to prevent fatigue of the plain bearing halves 1 are formed on the inflow preventive portions 4 as shown in FIGS. 4 and 5. The shallow fatigue preventive grooves 4a serve to prevent those surfaces of the plain bearing halves 1, which correspond to back sides of the inflow preventive portions 4, from being deformed and fatigued in a manner to project into the housing grooves 12, 16. That is, in the case where the shallow fatigue preventive grooves 4a were not formed on the inflow preventive portions 4, the shaft 20 would push the inflow preventive portions 4 through oil-film pressure, and the back sides of the inflow preventive portions 4 as pushed would be deformed in a manner to project into the housing grooves 12, 16 because the housing grooves 12, 16 are formed on the back sides of the inflow preventive portions 4 of the plain bearing halves 1 as described above. Hereupon, by forming the shallow fatigue preventive grooves 4a on the inflow preventive portions 4, the back sides of the inflow preventive portions 4 are prevented from being deformed in a manner to project into the housing grooves 12, 16. The shallow fatigue preventive grooves 4a are formed at a depth in the range of 0.01 to 0.05 mm to be shallower in depth than the crush relieves 3, so that the lubrication oil flowing into the crush relieves 3 from the oil grooves 5 of the plain bearing halves 1 can be restricted to the minimum.

In addition, while the plain bearing according to the embodiments described above have been described with respect to a plain bearing for supporting a main shaft of an automobile engine, etc. as one of examples of use, they are not limited to use for automobile engines but can be used for other internal combustion engines, etc.

The invention claimed is:

1. A plain bearing comprising a housing and two plain bearing halves forming a cylindrical shape in combination and fixed in the housing, each of the plain bearing halves having
    crush reliefs formed at both ends of an inner circumferential surface thereof in a circumferential direction,
    an oil groove formed on the inner circumferential surface thereof and extending in the circumferential direction,
    a hole (6) provided at a substantially central position in the circumferential direction and in communication with the oil groove, and
    inflow preventing portions formed between the crush reliefs and the oil groove.

2. A plain bearing according to claim 1, wherein said inflow preventing portions extend circumferentially in a range of 1 to 15 degrees from the crush reliefs toward the hole.

3. The plain bearing of claim 1, wherein said inflow preventing portions extend circumferentially in a range of 1 to 13 degrees from the crush reliefs toward the hole.

* * * * *